United States Patent [19]

Andrews

[11] Patent Number: 4,993,155
[45] Date of Patent: Feb. 19, 1991

[54] FRUSTUMIC PRESS

[76] Inventor: Roger O. Andrews, Rte. 2, Box 351, Westville, Fla. 32464

[21] Appl. No.: 390,382

[22] Filed: Aug. 7, 1989

[51] Int. Cl.⁵ .............................................. A47J 43/26
[52] U.S. Cl. ....................................... 30/120.2; 99/581
[58] Field of Search ............................ 30/120.1–120.5; 99/574, 575, 579–583; 68/243

[56] References Cited

U.S. PATENT DOCUMENTS

| | | | |
|---|---|---|---|
| 234,577 | 11/1880 | Huffman | 68/243 |
| 3,965,810 | 5/1975 | Miller | 99/581 |

Primary Examiner—Douglas D. Watts

[57] ABSTRACT

A gripping device with a plurality of rods, pivotably engaged to at least two plates. As the plates are rotated in opposite directions, the distance between rods is changed. One specific embodiment of the invention functions as a pecan cracker. A pecan placed within the perimeter of the rods, between the plates, will, upon sufficient rotation be grasped by the closing rods. Upon sufficient farther rotation, the pecan shell will crack. Control over the force applied is usually sufficient to properly crack the shell without breaking the meat of the pecan.

10 Claims, 5 Drawing Sheets

FRUSTUMIC PRESS

BACKGROUND

1. Field of Invention

This invention relates to a small, hand operated nut cracking device.

2. Description of Prior Art

Many consumers have small quantities of edible nuts, such as pecans and walnuts, at home. This creates a need for nutcrackers in the home, which can properly crack the tough shell of the nuts without unduly damaging the meat. It is desireable for these nutcrackers to operate quickly, easily, and as pleasantly as possible. Since the nutcracker may be left out in view of guests, it is beneficial for the nutcracker to be attractive and maintain an appealing posture.

Inventors have created numerous nut cracking devices. They have used various mechanical principles, such as single levers, double levers, screw action, and impact objects to crack the shells. U.S. Pat. No. 3,965,810 to Miller 1976 uses a different mechanical principle. A descriptive name for this principle would be frustumic leverage. A number of levers corresponding to the shape of a frustum are connected at each end to a rotatable plate. The levers are manipulated to crack the nuts. Due to the varying sizes of nuts and the design of the Miller device, only a small percentage of nuts would be cracked easily. Other nuts would be difficult to crack and usually the nut meat would be damaged excessively. Loose connections between the levers and plates, causes this type of nut cracker to rattle when moved. Loose connections also cause it to lean awkwardly to one side when it is left in a stationary position.

SUMMARY OF THE INVENTION

Accordingly, several objects and advantages of my invention are;

A. to provide a nutcracker which cracks a very high percentage of anticipated nuts quickly and easily. The levers of this device are improved. This improvement allows a design whereby a higher percentage of nuts can be easily cracked.

B. to provide a nutcracker that operates smoothly, even after considerable wear.

C. to provide a nutcracker that stands upright.

DESCRIPTION OF THE INVENTION

Figure 2:
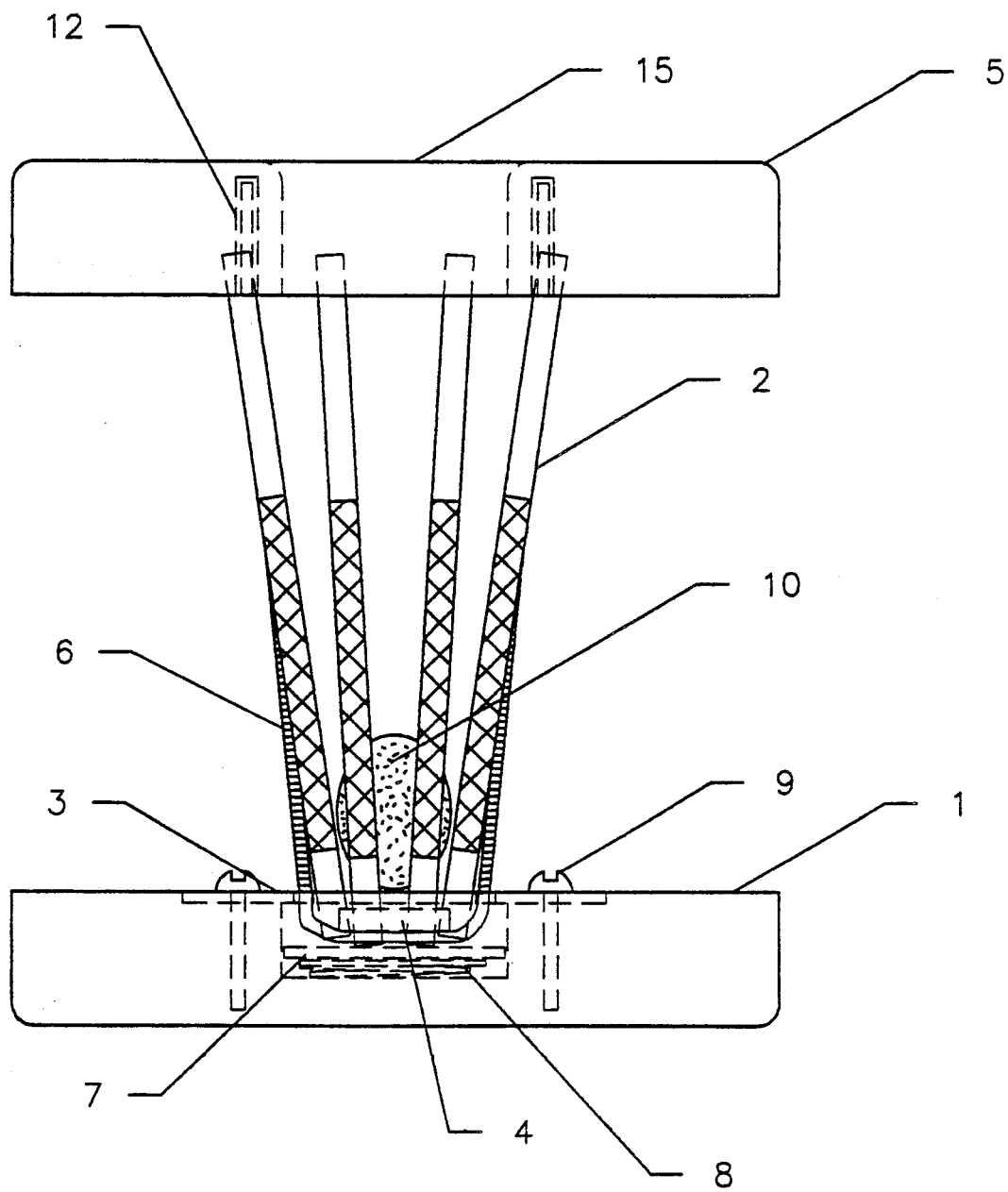
FIG. 2 shows a side view of the nutcracker.

A typical embodiment of the nutcracker of the present invention is shown in FIG. 2. A predetermined number of levers 2 are positioned relative to each other in a way that corresponds to the sides of a frustum. These levers are advantageously formed. The portion of levers 2 that may contact the nut contains diamond knurling, to resist movement of the nut along the lever. This increased resistance allows levers 2 to function properly at a greater overall taper. Increasing the overall taper of levers 2, increases the percentage of nuts that can be easily cracked. The levers are made of a high strength material such as steel. Levers 2 have sufficient length to adequately transfer the desired leveraged force and sufficient strength to exert the necessary leveraged force without excessive bending.

Figure 3:
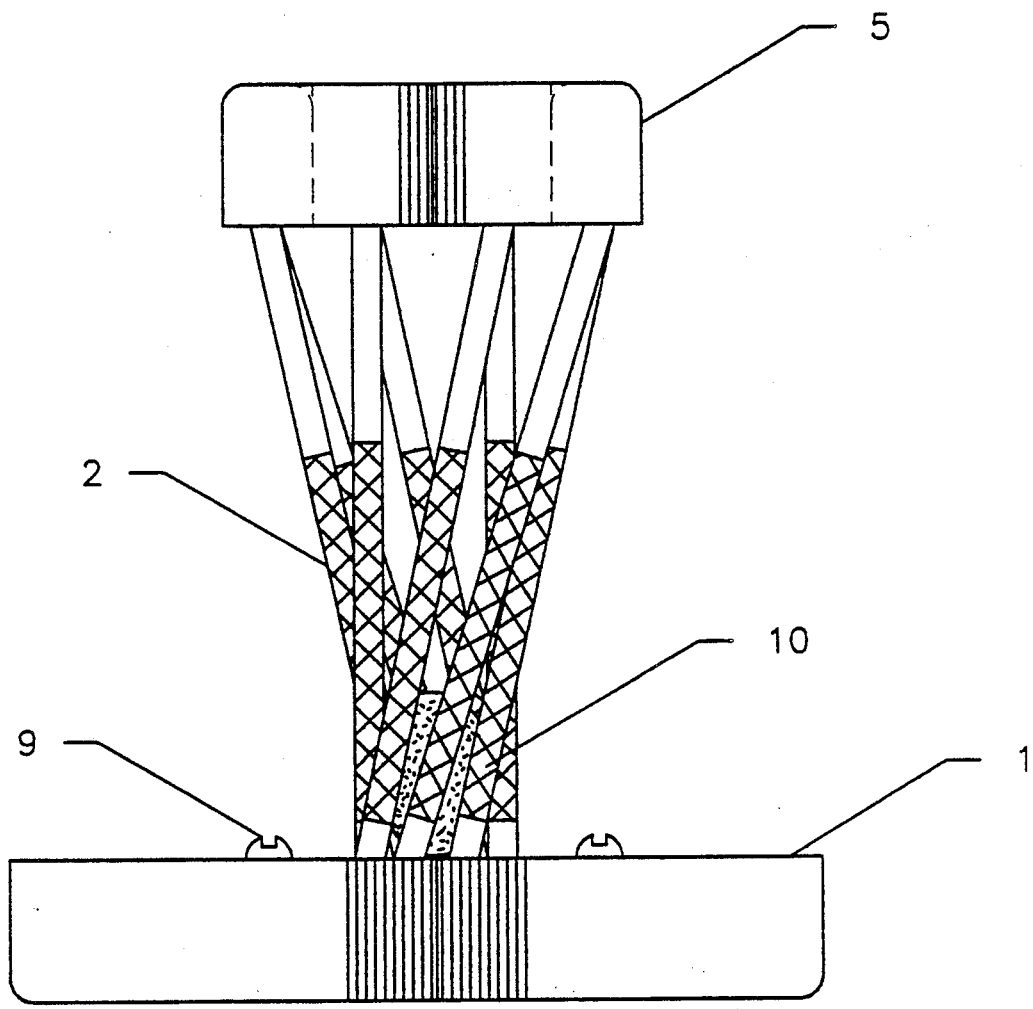
FIG. 3 shows the nutcracker in a rotated position.

The top portion of levers 2 FIG. 2 is pivotably engaged with a top plate 5. The bottom end portion of levers 2 is pivotably engaged with a bottom plate 3. Bottom plate 3 is fastened to a base plate 1 with two screws 9. Base plate 1 contains a spring 8 and a metal washer 7. The engagement of levers 2 with top plate 5 and bottom plate 3 is maintained by the combined action of screws 9, base plate 1, spring 8, metal washer 7, and a metal cable 6. Cable 6 passes through plate 3 and is anchored at each end within top plate cavities 12 with a suitable glue. Top plate 5 and base plate 1 are made of a suitable material such as wood. Plate 5 and plate 1 are of a size and shape that can comfortably and firmly be held in hand. The plate ends are elongated to facilitate the application of leveraged force. Plate 1 and plate 5 are capable of rotating in opposite directions about the center axis of the device, as shown in FIG. 3.

Figure 1:
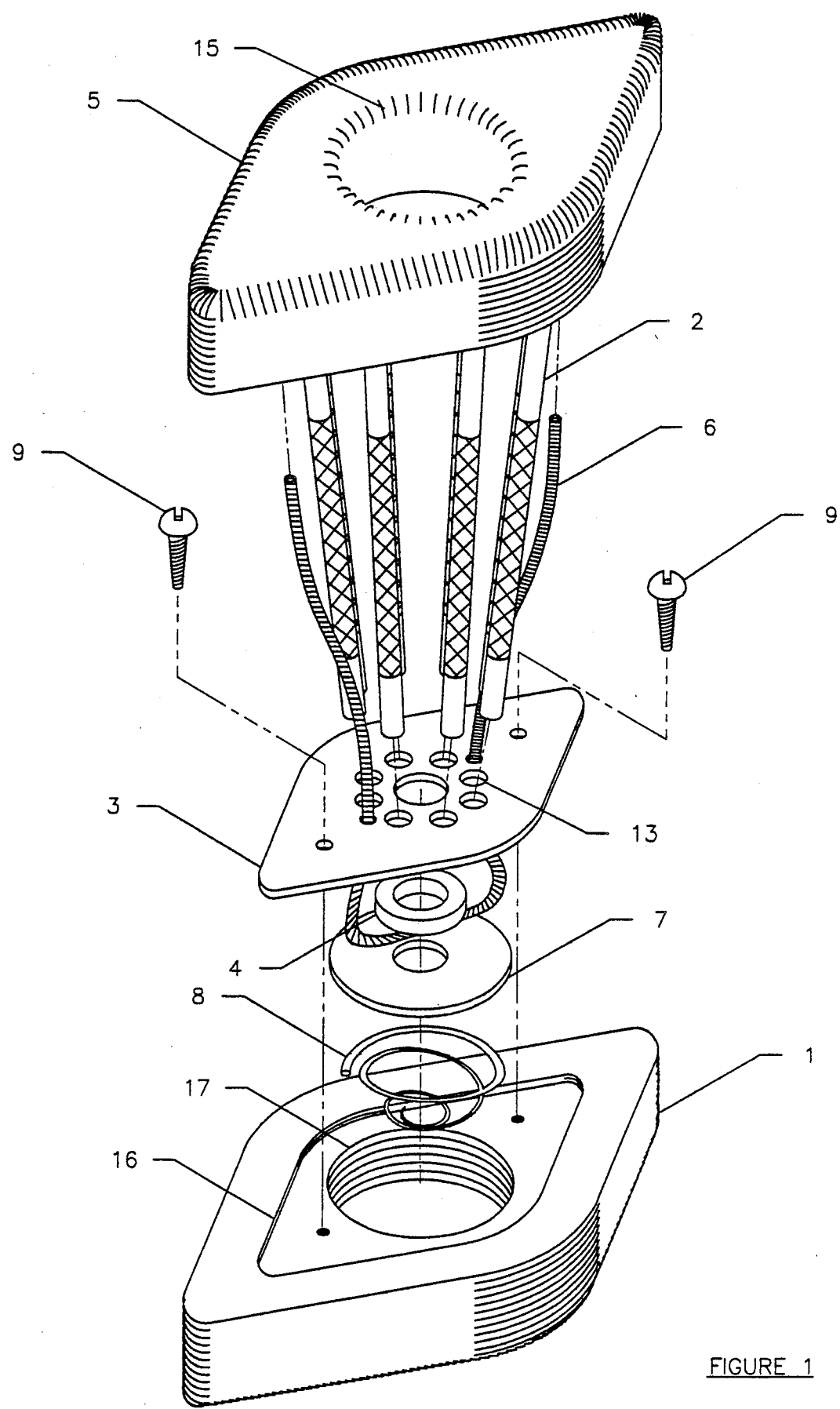
FIG. 1 is an exploded pictorial of a nutcracker.

Top plate 5 FIG. 1 contains a center aperture 15, that is large enough to allow the passage of nuts. The bottom side of top plate 5 FIG. 4 contains a predetermined number of cavities 14, for engaging the end of levers 2. Cavities 14 will be of sufficient depth and width to retain the lever ends during rotation. Cavities 14 are located at an equal distance from the axis of the device. Cavities 14 are distributed evenly around the axis.

Figure 4:
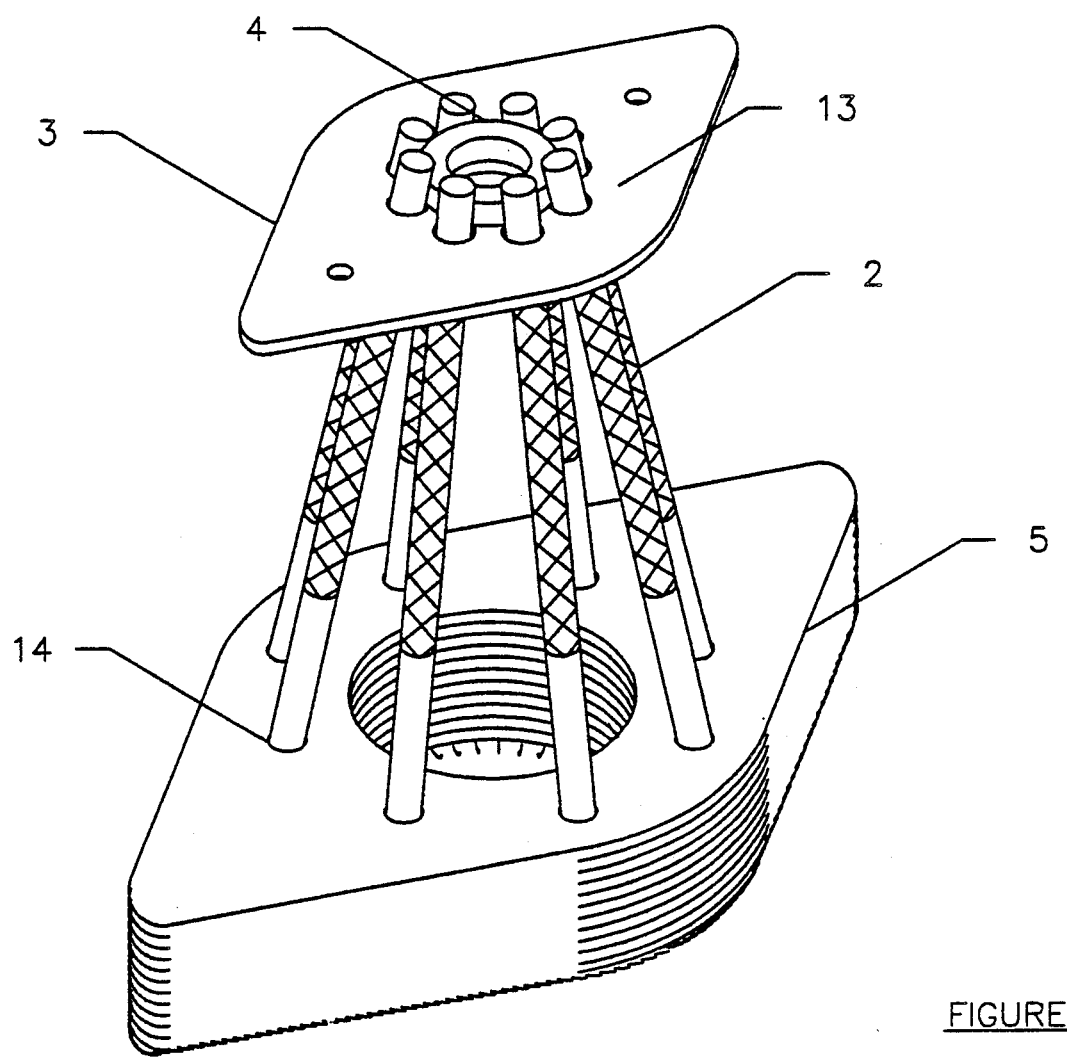
FIG. 4 shows a bottom view of a partially assembled nutcracker.
Figure 5:
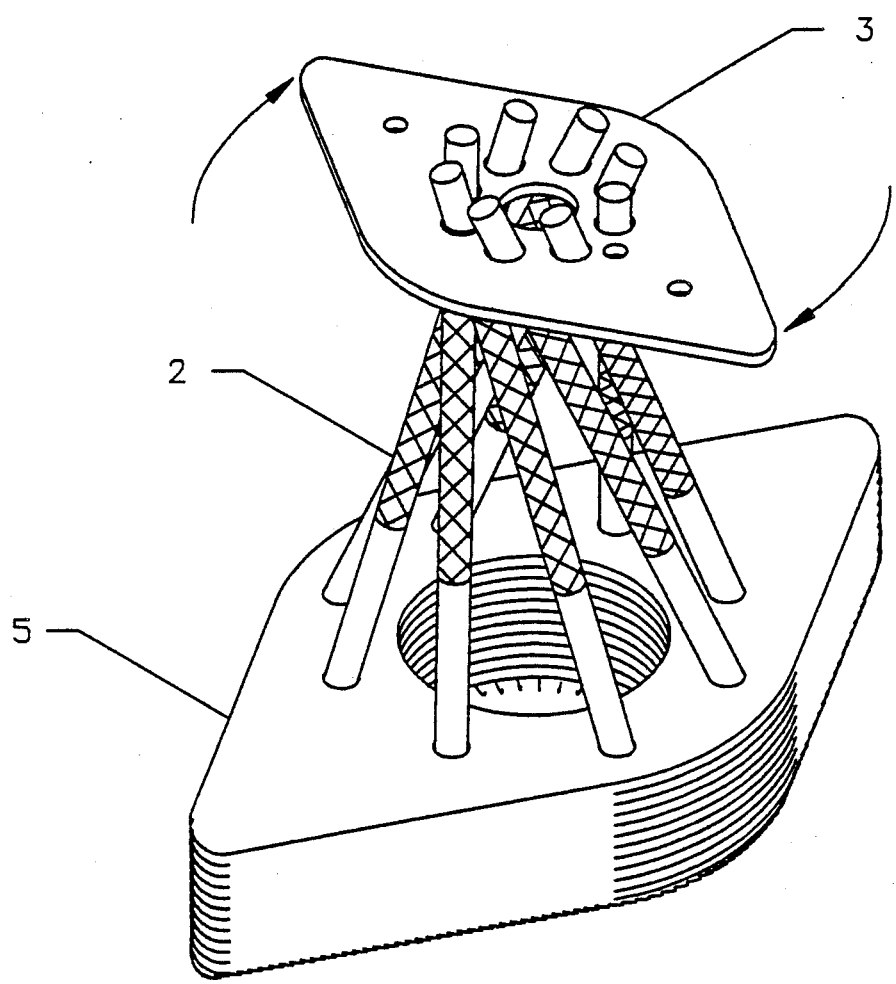
FIG. 5 shows a bottom view of the partially assembled nutcracker while in the rotated position.

Bottom plate 3 FIG. 4 contains a predetermined number of holes 13, allowing passage of levers 2 through plate 3. Holes 13 are of sufficient width to allow for the change in angle of levers 2 during rotation. Holes 13 in bottom plate 3 are correspondingly aligned with cavities 14 in top plate 5. The distance from cavities 14 to the axis is advantageously greater than the distance from holes 13 to the axis. Bottom plate 3 FIG. 1, contains two holes allowing the passage of cable 6 through the plate. Screws 9 pass through two holes in plate 3, and fasten plate 3 to base plate 1. Plate 3 is usually made of metal.

Base plate 1 FIG. 1, contains a recessed area 16 of adequate size and shape to accomodate bottom plate 3. Base plate 1 contains a cavity 17 of adequate size and shape to accomodate the section of levers 2 FIG. 2, that pass through bottom plate 3, the section of cable 6 located beneath bottom plate 3, a rubber washer 4 FIG. 1, a metal washer 7, and a spring 8.

Rubber washer 4 FIG. 4 is of sufficient thickness and width to exert an outward force on the end portion of levers 2.

Metal washer 7 FIG. 1 is of a size that allows free movement within cavity 17.

Spring 8 FIG. 1 is of sufficient strength and length to maintain adequate pressure against the end of levers 2 during operation.

OPERATION OF THE INVENTION

To operate the nutcracker, drop a nut through center aperture 15 FIG. 2, while the device is in an upright initial position (as shown in FIG. 2). Most nuts will lodge in levers 2, very near bottom plate 3. The very smallest nuts will come to rest on the bottom plate. Hold base plate 1 in left hand. With the right hand, twist top plate 5 in a clockwise direction (as shown in FIG. 3), until the nut shell is cracked sufficiently, by converging levers 2. Twist top plate 5 in a counterclockwise direction until the nutshell cracks again. Return top plate 5 to the initial position. Turn the device up-side-down and let the cracked nut fall out.

The nutcracker of the present invention utilizes a form of compound leverage that hereafter will be referred to as frustumic leverage. The mechanical principles that apply to frustumic leverage are difficult to understand by observation. After numerous hours of trial and error, it seems that the following rules apply.

A. As with simple leverage, the ratio of leverage is increased as the force recieving object nears the fulcrum or pivot point. (Bottom plate 3 functions as a fulcrum in the nutcracker. Nuts crack easier when located near bottom plate 3.)

B. Spacing the top ends of the levers further apart, thereby increasing the overall taper of the levers, increases the circular travel required of the top lever ends, for a given amount of rotation. This increases the ratio of leverage.

C. Spacing the bottom ends of the levers closer together, thereby increasing the overall taper of levers increases the ratio of leverage.

The overall taper of levers 2 of the present invention is greater than any found in prior art. This allows more nuts of varying size to be located advantageously near bottom plate 3. It also increases the ratio of leverage with which force is transmitted through the levers. This allows more nuts of varying size to be cracked with greater ease. This increased ease of operation allows greater controll over operation, whereby damage to nut meat is reduced.

Efforts to increase the taper of levers 2 were limited by the ability of levers 2 to hold the nut, during the cracking operation. Instead of cracking, the nut would pop up out of the constricting levers. The section of levers 2, that may contact the nut, contains diamond knurling which restricts upward movement of the nut. This restraint allows the use of a greater taper than would be possible with unimproved levers. The degree of taper of levers 2 is dependent upon the ability of the levers to hold the pecan, but it is preferred that the levers be tapered generally as shown in FIG. 2.

The nutcracker, as shown in FIG. 2, has the proper perspective for cracking nuts the size of pecans. For cracking other sized nuts such as walnuts, the distance between holes 13, and the distance between cavities 14 should be changed. After considering the size range of the nuts, these distances should be such that, while engaged levers 2 maintain the preferred taper, these nuts will lodge within levers 2 near bottom plate 3 FIG. 2 or, rest on bottom plate 3.

Levers 2 FIG. 4, pass through holes 13, in bottom plate 3 and compress rubber washer 4. This compression of washer 4 pushes levers 2 outward against outside edges of holes 13, tending to maintain nutcracker in upright position. Normal wear of levers 2 and edges of holes 13 is compensated for by the compressive force of washer 4.

Metal washer 7 FIG. 2 contacts bottom end of levers 2. Spring 8 FIG. 1, is compressed between washer 7 and the bottom of cavity 17, in an assembled nut nutcracker. The compressive force of spring 8 pushes metal washer 7 upward against bottom end of levers 2. This pushes the top end of levers 2 against top plate 5. Upward movement of plate 5 is limited by metal cable 6 FIG. 2. This causes spring 8 to remain in a state of compression, while maintaining the pivotable engagement of levers 2 with bottom plate 3 and top plate 5. The compressive force of spring 8, transferred through washer 7 and levers 2 to top plate 5, tends to maintain the nutcracker in an upright position. Normal wear in cavities 14 by levers 2 is compensated for by the compressive force of spring 8. The combined compressive action of spring 8 and rubber washer 4 induces a snug engagement of levers 2 with bottom plate 3 and top plate 5, thereby allowing continuous smooth operation of nutcracker. The combined compressive action of spring 8 and washer 4 maintains the nutcracker in an upright position.

Thus the reader will see that the nutcracker of the invention will crack a high percentage of anticipated nuts quickly and easily. The nutcracker will operate smoothly, and maintain an appealing upright posture.

While my above description contains many specificities, these should not be construed as limitations on the scope of the invention, but rather as an exemplification of one preferred embodiment thereof. Many other variations are possible. For example, cable 6 may be replaced with springs or connecting rods. Though several positive aspects of the invention would be lost, the pivotable engagement of levers 2 with bottom plate 3 and top plate 5 may be maintained by independently connecting the ends of levers 2 to the corresponding plates. Bottom plate 3 and base plate 5 may be combined into a single plate. The diamond knurling of levers 2 may be replaced with another form that restrains the nut, such as ridges, grooves, etching, or abrasive plating.

Accordingly, the scope of the invention should be determined not by the embodiment illustrated, but by the appended claims and their legal equivalents.

I claim:

1. In a nutcracker of the type comprising top and bottom plates, the top plate having an aperture for the insertion of nuts to be cracked, and a plurality of levers, each of which is pivotably connected at its end portion to said plates; said levers being positioned relative to each other in such a way as to correspond to the shape of a frustum, the base of which is at the nut inserting end, said levers being spaced and disposed in an array defining together with said plates an enclosure for retaining a nut within; so that rotating one plate with respect with the other constricts said enclosure to crack nuts; the improvement, wherein said levers contain knurling, ridges, grooves, etching or abrasive plating to restrict upward movement of the nut whereby the overall taper of said levers permit nuts to be retained and cracked within said levers near said bottom plate.

2. The nutcracker of claim 1 wherein, said top plate is constructed of a rigid material, in a form of adequate size and shape, so as to be easily and comfortably held in hand.

3. The nutcracker of claim 1 wherein, the top end portion of said levers are engaged within cavities located in said top plate, said levers are engaged within holes located in said bottom plate, a bottom portion of said levers extend beneath said bottom plate, the engagement of said levers with said plates is sustained by a means of maintaining engagement which comprises, A. a section of metal cable connecting said top plate to said bottom plate, B. a metal washer located on the bottom ends of said levers, C. a spring located beneath said metal washer, D. a base plate located beneath said spring, said base plate is fastened to said bottom plate, thereby engagement is maintained.

4. The nutcracker of claim 3, further including a rubber washer which is compressed between said bottom portion of said levers that extend beneath said bottom plate, so that said rubber washer and said means of maintaining engagement stabilizes said nutcracker in an upright position and induces smooth operation.

5. The nutcracker of claim 3, wherein said base plate is constructed of a rigid material of adequate size and shape so as to be easily and comfortably held in hand.

6. A nutcracker comprising,
A. a bottom plate,
B. a top plate that contains an aperture for the insertion of nuts,
C. a plurality of levers aligned with each other so as to correspond to the shape of a frustum, the frustum base corresponding to a top end of said levers, a bottom portion of said levers being pivotably engaged with said bottom plate, a top portion of said levers being pivotably engaged with said top plate,
D. a means for maintaining the engagement of said levers with said plates, said levers are maintained in an array of adequate taper and size to retain anticipated nuts within said levers advantageously near said bottom plate, so that rotating one plate about the axis of said nutcracker contrary to the other plate, causes intermediate sections of said levers to converge toward each other to crack nuts, said levers contain knurling, ridges, grooves, etching or abrasive plating to restrict upward movement of the nut whereby the overall taper of said levers permit nuts to be retained and cracked within said levers near said bottom plate.

7. The nutcracker of claim 6 wherein, said top plate is constructed of a rigid material, in a form of adequate size and shape, so as to be easily and comfortably held in hand.

8. The nutcracker of claim 6 wherein, the top end portion of said levers are engaged within cavities located in said top plate, said levers are engaged within holes located in said bottom plate, a bottom portion of said levers extend beneath said bottom plate, the engagement of said levers with said plates is sustained by said means of maintaining engagement which comprises,
A. a section of metal cable connecting said top plate to said bottom plate,
B. a metal washer located on the bottom ends of said levers,
C. a spring located beneath said metal washer,
D. a base plate located beneath said spring, said base plate is fastened to said bottom plate, thereby engagement is maintained.

9. The nutcracker of claim 8, further including a rubber washer which is compressed between said bottom portion of said levers that extend beneath said bottom plate, so that said rubber washer and said means of maintaining engagement stabilizes said nutcracker in an upright position and induces smooth operation.

10. The nutcracker of claim 8, wherein said base plate is constructed of a rigid material of adequate size and shape so as to be easily and comfortably held in hand.

* * * * *